(12) United States Patent
Yamamoto (10) Patent No.: US 11,953,624 B2
(45) Date of Patent: Apr. 9, 2024

(54) RANGING APPARATUS (71) Applicant: DENSO CORPORATION, Kariya (JP)

(72) Inventor: Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 181 days.

(21) Appl. No.: 17/645,579

(22) Filed: Dec. 22, 2021

(65) Prior Publication Data
US 2022/0113382 A1  Apr. 14, 2022

Related U.S. Application Data (63) Continuation of application No. PCT/JP2020/025050, filed on Jun. 25, 2020.

(30) Foreign Application Priority Data

Jun. 28, 2019 (JP) .................. 2019-121790

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01)

(58) Field of Classification Search
CPC ................. G01S 7/4813; G01S 17/931; G01S 2007/4977
See application file for complete search history.

(56) References Cited

U.S. PATENT DOCUMENTS

| | | | |
|---|---|---|---|
| 6,414,623 B1 | 7/2002 | Ashihara | |
| 7,783,400 B1 * | 8/2010 | Zimler | B60S 1/026 219/202 |
| 10,173,646 B1 * | 1/2019 | Rice | B60S 1/485 |
| 2007/0241612 A1 * | 10/2007 | Jacoby | B60S 1/0818 307/9.1 |
| 2014/0320845 A1 | 10/2014 | Bayha et al. | |
| 2018/0272945 A1 * | 9/2018 | Worthen | G01J 1/4228 |
| 2018/0272946 A1 * | 9/2018 | Worthen | B60R 1/06 |
| 2019/0353761 A1 * | 11/2019 | Kim | G01S 17/931 |
| 2019/0353762 A1 * | 11/2019 | Kim | G01S 17/42 |
| 2020/0156593 A1 * | 5/2020 | Boss | B60S 1/3463 |

FOREIGN PATENT DOCUMENTS

| | | |
|---|---|---|
| JP | 62-77704 A | 4/1987 |
| JP | 10-48332 A | 2/1998 |
| JP | 2011-2420 A | 1/2011 |
| JP | 2017-90382 A | 5/2017 |

* cited by examiner

*Primary Examiner* — Carlos Garcia
(74) *Attorney, Agent, or Firm* — MASCHOFF BRENNAN (57) ABSTRACT

A ranging apparatus is provided which is mountable to a vehicle and includes a transmitter, at least one detector, a light transmissive window, a heater, a snow accumulation condition determiner, a snowfall condition determiner, and a heater controller. The heater works to heat the transmissive window. The snow accumulation condition determiner determines a snow accumulation condition of a surface of the light transmissive window. The snowfall condition determiner determines a snowfall condition around the vehicle. The heater controller works to control energization of the heater depending upon the snow accumulation condition and the snowfall condition. The heater controller stops energizing the heater for a period of time when it is determined that there is neither the snow accumulation on the surface of the light transmissive window nor the snowfall around the vehicle.

6 Claims, 5 Drawing Sheets

RANGING APPARATUS

CROSS REFERENCE TO RELATED DOCUMENT

The present application claims the benefit of priority of Japanese Patent Application No. 2019-121790 filed on Jun. 28, 2019, the disclosure of which is incorporated in its entirely herein by reference.

TECHNICAL FIELD

This disclosure generally relates to a ranging apparatus.

BACKGROUND ART

There are ranging devices which are mounted in a vehicle and designed to transmits waves forward and receive a return of the wave reflected from an object to calculate a distance to the object.

The ranging devices are equipped with a cover arranged on a front surface thereof to physically protect transmitter which transmits waves and a receiver which receives returns of the waves. Adhesion of snow to the cover may, however, result in a decrease in measurement accuracy of the ranging devices.

Patent literature 1 teaches installation of a heater in the cover of the ranging device to melt the snow.

PRIOR ART DOCUMENT

Patent Literature

Patent Literature1 Japanese Translation of PCT Internal Application Publication No. 2015-506459

SUMMARY OF THE INVENTION

In case where a heater is mounted in a window of the cover of the ranging device through which a transmit wave and a return of the transmit wave pass, energization of the heater may be controlled as a function of the ambient temperature. The inventors of this application have reviewed this situation and found that when the outside temperature is low, but no snow is adhered to the window, continued activation of the heater may face a drawback in that drops of water attached to the light transmissive window evaporate, so that dirt may adhere to the light transmissive window.

On aspect of this disclosure is to provide techniques to reduce dirt sticking to a light transmissive window.

One aspect of this disclosure is to provide a ranging apparatus which is mountable to a vehicle and configured to emit a transmit wave and detects a reflected wave resulting from reflection of the transmit wave from an object to determine a distance between itself and the object. The ranging apparatus comprises a transmitter, at least one detector, a light transmissive window, a heater, a snow accumulation condition determiner, a snowfall condition determiner, and a heater controller. The transmitter is configured to emit the transmit wave. The detector is configured to detect the reflected wave. The light transmissive window permits at least one of the transmit wave and the reflected wave to pass therethrough. The heater is configured to apply heat to the transmissive window. The snow accumulation condition determiner determines a snow accumulation condition indicating accumulation of snow on a surface of the light transmissive window. The snowfall condition determiner determines a snowfall condition indicating snowfall around the vehicle. The heater controller works to control energization of the heater depending upon the snow accumulation condition and the snowfall condition. The heater controller stops energizing the heater for a period of time when it is determined that there is neither snow accumulation on the surface of the light transmissive window nor snowfall around the vehicle.

The above structure is capable of reducing a risk that dirt may stick to the light transmissive window.

MODE FOR CARRYING OUT THE INVENTION

Embodiments in this disclosure will be described below with reference to the drawings.

1 First Embodiment 1-1 Structure

The LiDAR apparatus 100 is a ranging device working to emit light in the form of a transmission wave and detect a reflected wave from an object irradiated with the light to calculate a distance to the object. LiDAR stands for Light Detection and Ranging. The LiDAR apparatus 100 is mounted in a vehicle in use to detect various types of objects present ahead of the vehicle.

Figure 1:
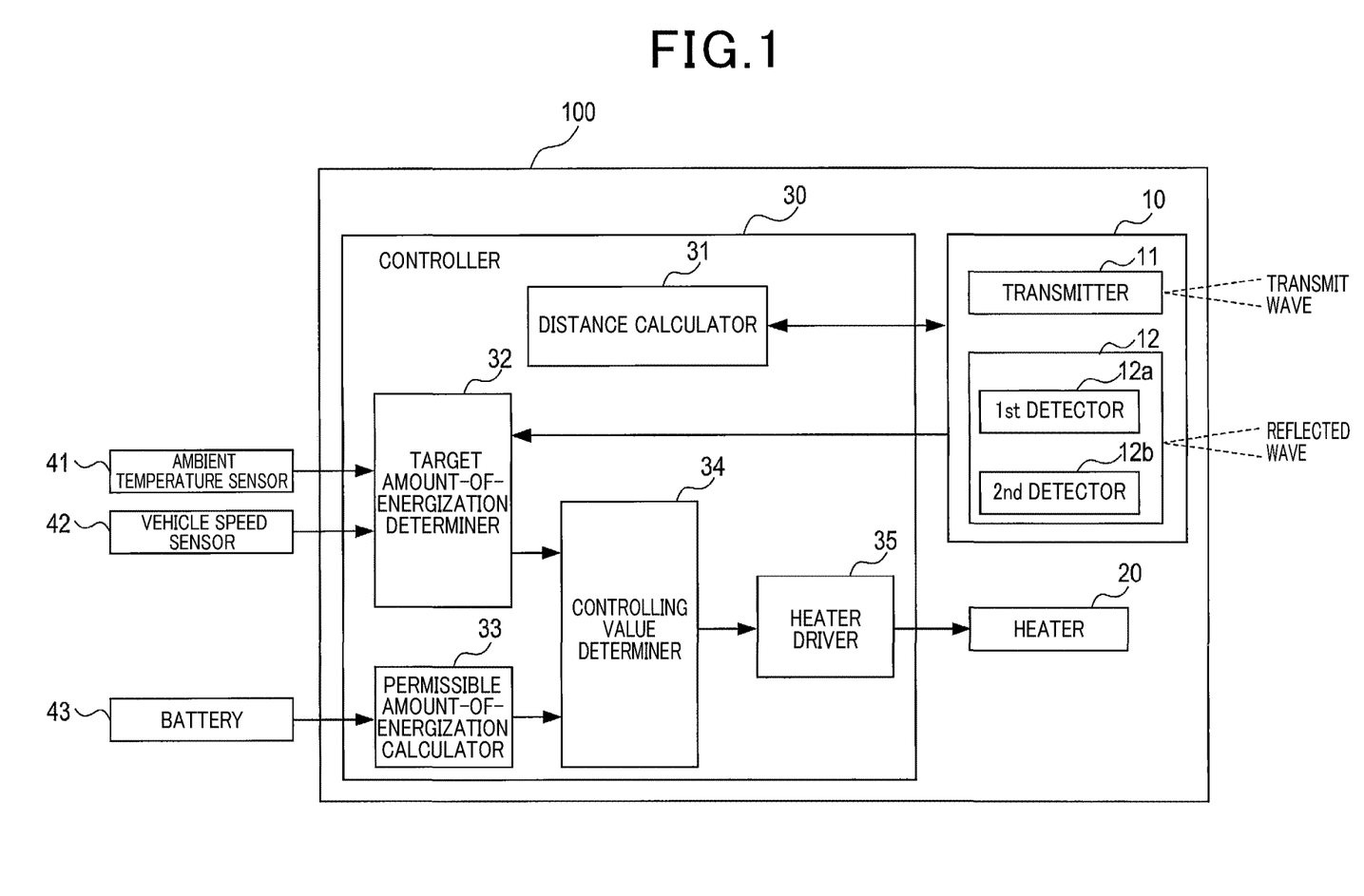
FIG. 1 is a block diagram which illustrates a structure of a LiDAR apparatus according to the first embodiment.

The LiDAR apparatus 100 includes the measuring device 10, the heater 20, and the controller 30.

The measuring device 10 includes the transmitter 11 working to emit light and the detector 12 working to receive reflected light resulting from reflection of the emitted light.

The transmitter 11 is configured to emit light in the form of a laser beam.

The detector 12 includes the first detector 12a and the second detector 12b. The first detector 12a is used to detect the reflected wave from the target object and equipped with an amplifier circuit working to amplify the intensity of an electrical signal into which a received light signal is converted. The first detector 12a is also used to detect waves reflected from floating substances in the air, such as rain or snow. The second detector 12b is used to detect a wave reflected from a substance, as described later, which is adhered to the surface of the light transmissive window 121. The second detector 12b is not equipped with an amplifier in this embodiment, but may alternatively be configured to include an amplifier whose degree of amplification of a signal is selected to be lower than that of the amplifier of the first detector 12a.

Figure 2:
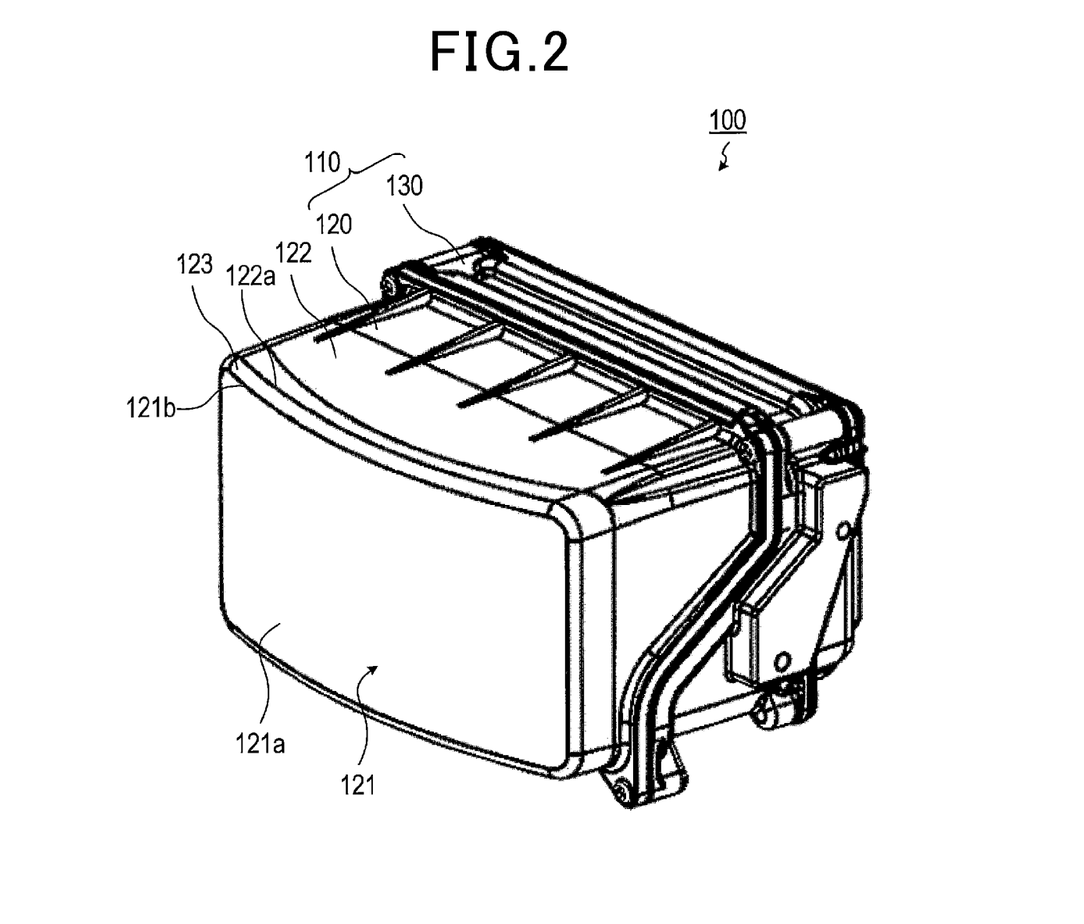
FIG. 2 is a view of an outer appearance of a LiDAR apparatus.

The measuring device 10 is disposed inside the case 110 including the cover 120 and the case body 130 of the LiDAR apparatus 100 illustrated in FIG. 2. The transmitter 11 of the measuring device 10 is disposed in an upper region of space in the case 110, while the detector 12 is disposed in a lower region of space in the case 110.

The cover 120 has disposed in a front portion thereof the transparent light transmissive window 121 which defines a portion of the cover 120 and allows light to pass therethrough. The front, as referred to herein, indicates a forward direction in which the LiDAR apparatus 100 emits light. The light transmissive window 121 isolates the inside of the LiDAR apparatus 100 from the outside thereof.

Figure 3:
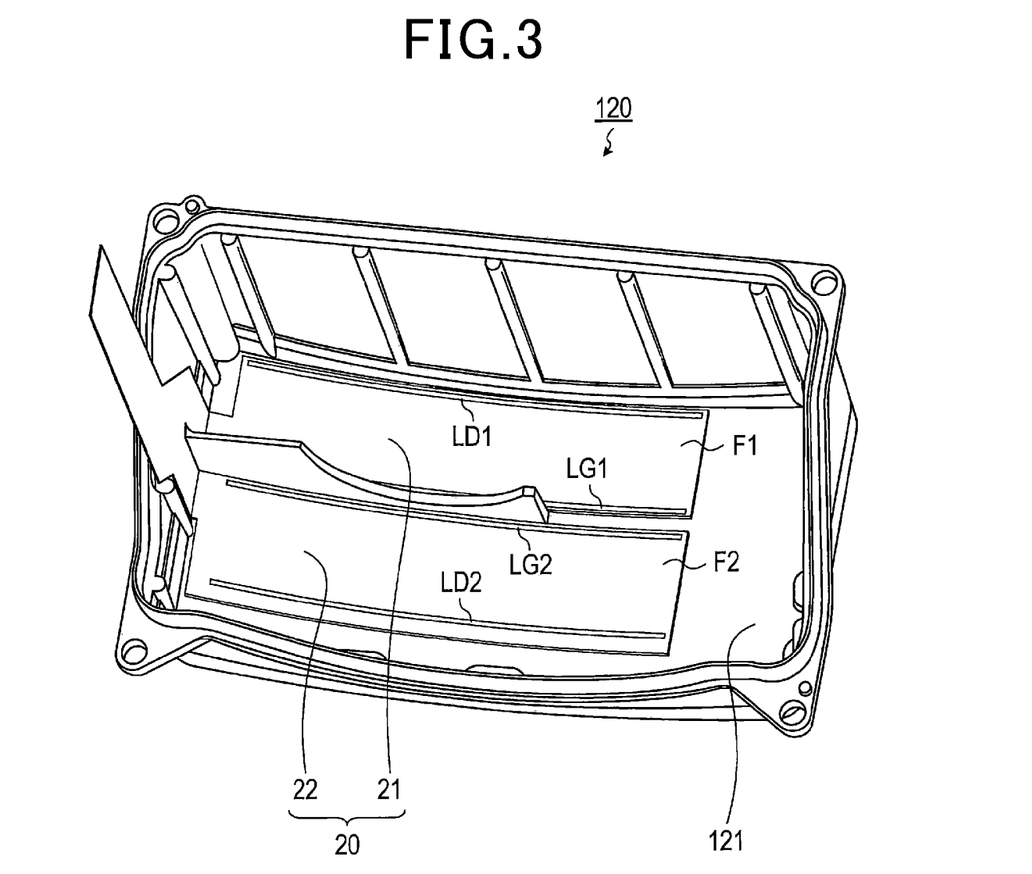
FIG. 3 is an illustration of a LiDAR apparatus, as viewed from inside the LiDAR apparatus.

The heater 20 works to add heat from inside the LiDAR apparatus 100 to the light transmissive window 121. The heater 20 is, as clearly illustrated in FIG. 3, attached to an inner surface of the light transmissive window 121. The heater 20 includes the transmitter heater 21 disposed on a portion of the light transmissive window 121 which is located close to the transmitter 11 and the detector heater 22 disposed on a portion of the light transmissive window 121 which is located close to the detector 12. Each of the transmitter heater 21 and the detector heater 22 is equipped with a transparent conductive film Fi and a pair of electrodes LDi and LGi. "i" represents 1 when it belongs to the transmitter heater 21 or 2 when it belongs to the detector heater 22. The transparent conductive film Fi is used as a heater film made from material which is transparent and electrically conductive. For instance, the transparent conductive film Fi is made by an ITO (Indium Tin Oxide) film.

The controller 30 illustrated in FIG. 1 is implemented by a microcomputer which is made up of a CPU, a RAM, a ROM, an I/O interface, and bus lines connecting them and operative to execute a variety of tasks. The controller 30 includes functional blocks or virtual components realized by executing programs stored in the ROM. Specifically, the controller 30 includes the distance calculator 31, the target amount-of-energization determiner 32, the permissible amount-of-energization calculator 33, the controlling value determiner 34, and the heater driver 35.

The distance calculator 31 is configured to calculate a distance to an object irradiated with light using the measuring device 10. Specifically, the distance calculator 31 analyzes the waveform of an electrical signal inputted from the detector 12 into the distance calculator 31 to determine a time when the reflected light was detected and calculates the distance to the object as a function of a difference between the time when the light was emitted and the time when the reflected light was detected. The distance calculator 31 is also capable of obtaining information about, for example, an azimuth of the object in addition to the distance to the object.

The target amount-of-energization determiner 32 analyzes a result of detection of a wave reflected from a floating substance in the air by the first detector 12a and the ambient temperature that is a temperature outside the LiDAR apparatus 100 to determine a condition of a snowfall around the vehicle. Such a snowfall condition represents current statuses of snowfall around the vehicle which include the presence or absence of snowfall around the vehicle and the amount of the snowfall in the event of snowfall. In this embodiment, the target amount-of-energization determiner 32 determines, as the snowfall condition, the level of amount of snowfall around the vehicle. Specifically, the snowfall condition is divided into four levels: high, middle, low, and zero (no snowfall), as a function of the amount of snowfall around the vehicle.

The target amount-of-energization determiner 32 is also configured to analyze a result of detection of a wave reflected from a floating substance attached to the surface of the light transmissive window 121 by the second detector 12b and the ambient temperature to determine a condition of snow accumulated on the surface of the light transmissive window 121. Such a snow accumulation condition represents current statuses of accumulation of snow on the surface of the light transmissive window 121 which include the presence or absence of accumulation of snow on the surface of the light transmissive window 121 and an accumulated amount of snow in the event of snow accumulation. In this embodiment, the target amount-of-energization determiner 32 determines, as the snow accumulation condition, the level of amount of snow accumulated on the surface of the light transmissive window 121. Specifically, the snow accumulation condition is broken into four levels: high, middle, low, and zero (no snow accumulation), as a function of the amount of snow accumulated on the surface of the light transmissive window 121.

The target amount-of-energization determiner 32 obtains the ambient temperature measured by the ambient temperature sensor 41 mounted in the vehicle. The ambient temperature sensor 41 is disposed in a lower portion of the vehicle and measures the ambient temperature outside the vehicle.

The target amount-of-energization determiner 32 is configured to determine a target amount of electricity supplied to the heater 20 (which will also be referred to as a target amount of energization) using the results of determination of the snowfall condition and the snow accumulation condition, the ambient temperature, and the speed of the vehicle (which will also be referred to as vehicle speed) in which the LiDAR apparatus 100 is mounted. An operation, as will be described later, executed by the target amount-of-energization determiner 32 is to calculate, as a target amount of electricity, an electrical power that is the rate, per unit time, at which electrical energy is delivered to the heater 20. The target amount-of-energization determiner 32 obtains the vehicle speed from the vehicle speed sensor 42 mounted in the vehicle.

The permissible amount-of-energization calculator 33 works to analyze the level of voltage (which will also be referred to below as battery voltage) developed at the battery 43 mounted in the vehicle to calculate the amount of electricity the battery 43 is capable of supplying or outputting (which will also be referred to below as permissible amount-of-electricity).

The controlling value determiner 34 is configured to determine a controlling value, as will be described later in detail, used for control of the energization of the heater 20 by the heater driver 35. The controlling value, as referred to in this embodiment, represents a duty cycle or duty factor that is a ratio of a period of time for which the electricity is supplied to the heater 20 to a period of time for which the electricity is stopped from being supplied to the heater 20. The controlling value determiner 34 determines the duty factor as a function of the target amount of electricity derived by the target amount-of-energization determiner 32 and the permissible amount-of-electricity calculated by the permissible amount-of-energization calculator 33. In this embodiment, the battery 43 is connected directly to the heater 20 without passing through a constant voltage circuit in the vehicle, so that the voltage applied to the heater 20 usually varies with a change in the battery voltage. The controlling value determiner 34, therefore, determines the duty factor as a function of the amount of electricity the battery 42 is now capable of outputting to bring an actual amount of electricity supplied to the heater 20 into agreement with the target amount of electricity determined by the target amount-of-energization determiner 32.

The heater driver 35 is configured to control the energization of the heater 20 based on the controlling value determined by the controlling value determiner 34.

1-2 Operation

Figure 4:
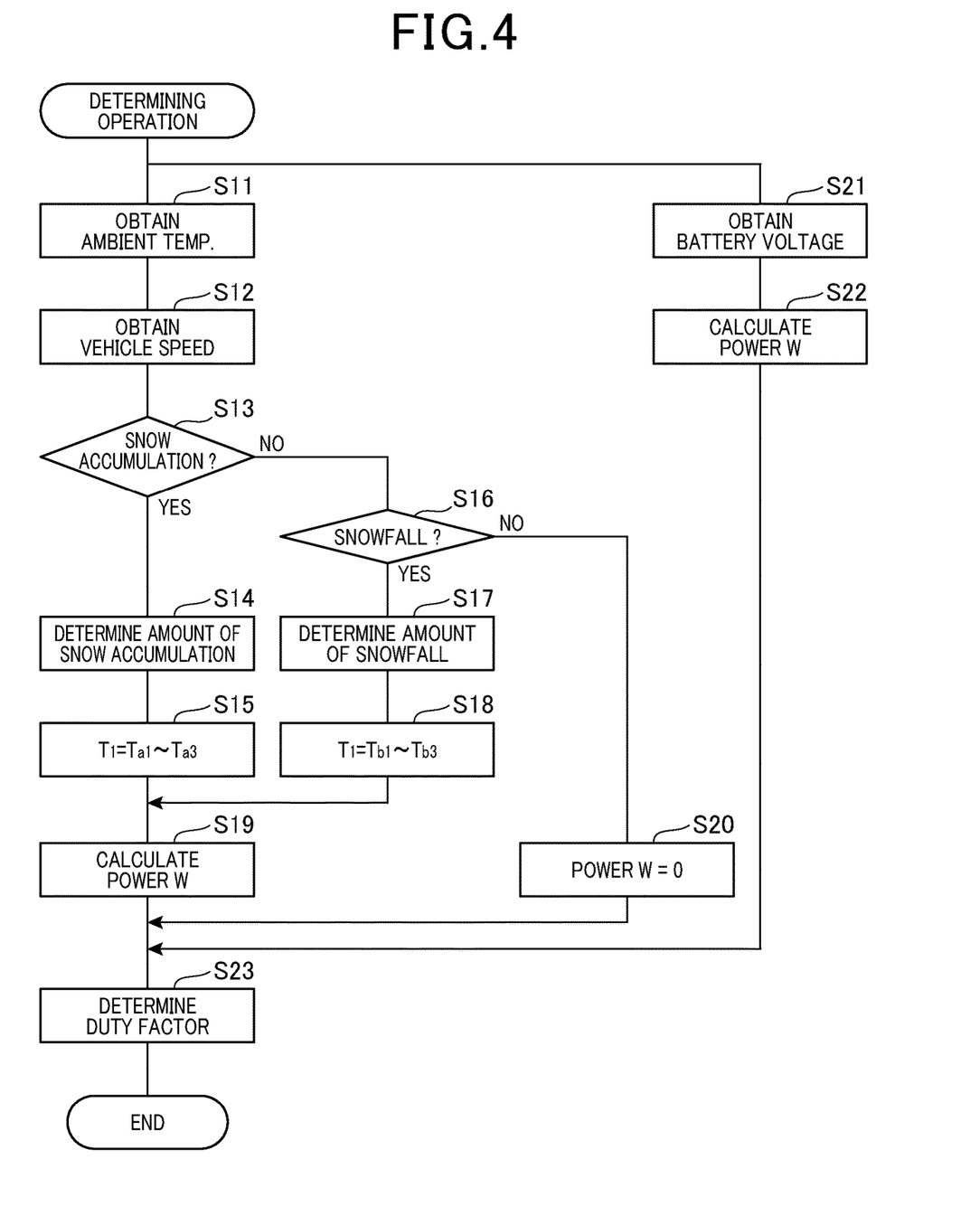
FIG. 4 is a flowchart of a determining an operation executed by a controller.

A determining operation executed by the controller 30 will be described below with reference to a flowchart in FIG. 4. The determining operation in FIG. 4 is performed cyclically at a given interval after an ignition switch of the vehicle is turned on.

In step S11, the controller 30 obtains the ambient temperature from the ambient temperature sensor 41.

Subsequently, in step S12, the controller 30 also obtains the vehicle speed from the vehicle speed sensor 42.

In step S13, the controller 30 uses the result of detection, as achieved by the second detector 12b, of a wave reflected from a substance attached to the surface of the light transmissive window 121 and the ambient temperature to determine whether snow is now accumulated on the surface of the light transmissive window 121. Specifically, when the wave reflected from the substance adhered to the surface of the light transmissive window 121 is detected by the second detector 12b, and the ambient temperature is less than or equal to a snow accumulation reference level, the controller 30 determines that there is snow accumulation on the surface of the light transmissive window 121. The snow accumulation reference level is defined by a predetermined temperature.

If determining in step S13 that snow is now accumulated on the surface of the light transmissive window 121, the routine proceeds to step S14 wherein the controller 30 determines the level of amount of snow on the surface of the light transmissive window 121. In this embodiment, the level of the amount of snow accumulation is expressed by one of three levels: high, middle, and low as a function of a detected amount of the wave reflected from the substance adhered to the surface of the light transmissive window 121.

Subsequently, in step S15, the controller 30 sets the target surface temperature $T_1$ of the heater 20 to the target surface temperature $T_a$ used in the event of snow accumulation as a function of the level of amount of snow accumulation on the surface of the light transmissive window 121 determined in step S14. The routine proceeds to step S19. The target surface temperature $T_a$ used in the event of snow accumulation is selected to increase with an increase in amount of snow accumulation. In this embodiment, the target surface temperature $T_a$ used in the event of snow accumulation is set to be one of three temperatures $T_{a1}$, $T_{a2}$, and $T_{a3}$ which corresponds to one of the high, middle, or low levels of the amount of snow accumulation which is determined in step S14.

Alternatively, if the controller 30 determines in step S13 that no snow is accumulated on the surface of the light transmissive window 121, then the routine proceeds to step S16.

In step S16, the controller 30 determines whether there is a snowfall around the vehicle using the result of detection, as achieved by the first detector 12a, of a wave reflected from a floating substance in the air and the ambient temperature. Specifically, when a wave arising from reflection of a transmit wave from a substance floating in the air is detected by the first detector 12a, and the ambient temperature is less than or equal to a snowfall reference level, the controller 30 concludes that there is a snowfall around the vehicle. The snowfall reference level is a predetermined temperature level. In this embodiment, the snow accumulation reference level and the snowfall reference level are selected to be identical with each other, but however, they may be different from each other.

The first detector 12a serves to detect both the wave reflected from a target to be ranged and the wave reflected from a substance floating in the air and is capable of determining whether an object detected is the target to be ranged or the floating substance in the air using the size of the detected object.

If the controller 30 determines in step s16 that there is a snowfall around the vehicle, then the routine proceeds to step S17 wherein the level of amount of snowfall around the vehicle is determined. In this embodiment, the level of the amount of snowfall is expressed by one of three levels: high, middle, and low as a function of a detected amount of wave reflected from the substance floating in the air.

Subsequently, in step S18, the controller 30 sets the target surface temperature $T_1$ of the heater 20 to the target surface temperature $T_b$ used in the event of snowfall as a function of the level of amount of snowfall around the vehicle determined in step S17. The routine then proceeds to step S19. The target surface temperature $T_b$ used in the event of snowfall is selected to increase with an increase in amount of snowfall. In this embodiment, the target surface temperature $T_b$ used in the event of snowfall is set to be one of three temperatures $T_{b1}$, $T_{b2}$, and $T_{b3}$ which corresponds to one of the high, middle, or low levels of the amount of snowfall which is determined in step S17. The target surface temperature $T_a$ used in the event of snow accumulation is selected to be higher than the target surface temperature $T_b$ used in the event of snowfall. This is because in the event of snow accumulation, the amount of electrical energy needed to be delivered to the heater 20 to melt snow accumulated on the light transmissive window 121 is usually larger than that in the event of snowfall.

In step S19, the controller 30 determines the electrical power W [W] need to be supplied to the heater 20 using the ambient temperature and the speed of the vehicle. The electrical power W, as referred to herein, is a target power supply for the heater 20.

The electrical power W is derived by the equation (1) below which includes the heat transfer coefficient h [W/(m²·K)] and a value derived by subtracting the ambient temperature $T_0$ [K] from a predetermined target surface temperature $T_1$ [K] of the heater 20, as determined in step S15 or S18.

$$W = q \times A = h \times (T_1 - T_0) \times A \qquad (1)$$

where q is thermal flux [W/m²], and A is a surface area [m²] of the heater 20.

The heat transfer coefficient h is derived using the Nusselt number Nu and the characteristic length L.

The Nusselt number Nu, as referred to herein, is a Nusselt number assuming that forced convection is created in the shape of a flat plate to act on an upper surface or a lower surface of the case 100 in the LiDAR apparatus 100 mounted in the vehicle.

Figure 5:
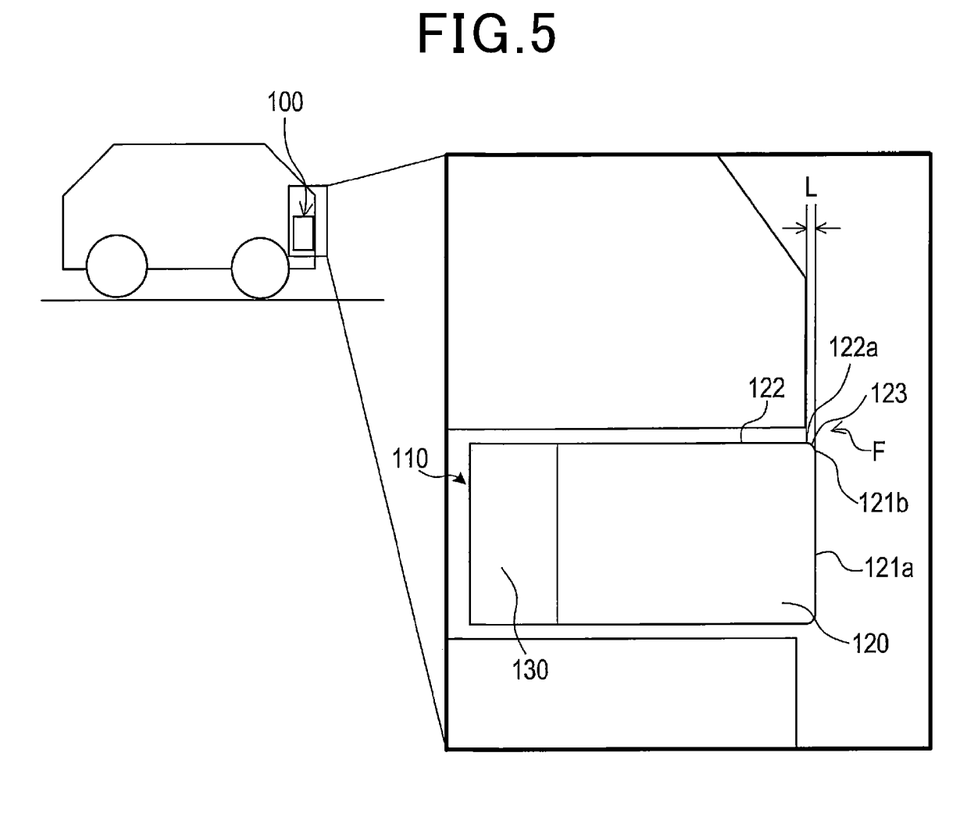
FIG. 5 is a sectional view of a LiDAR apparatus mounted in a vehicle.

The characteristic length L is a length of at least a portion of the upper surface or the lower surface of the case 110 which extends in a direction in which the vehicle travels. The characteristic length L may be selected in a range of the length of the portion of the upper surface or the lower surface of the case 110 which extends in the direction in which the vehicle travels. The characteristic length L in this embodiment will be described below with reference to FIG. 5. FIG. 5 demonstrates a cross section of the LiDAR apparatus 100 taken in a vertical direction perpendicular to the travel direction of the vehicle. In the cross section, the characteristic length L represents a dimension of the round corner 123 of the case 110 in the travel direction. The round corner 123 connects between the upper surface 122 of the cover 120 that is a portion of the case 110 and the front surface 121a of the light transmissive window 121. More specifically, the characteristic length L is given in a range where a portion of the case 100 extending in the travel direction of the vehicle decreases gradually, that is, a dimension of the case 100 between the upper edge 121b of the front surface 121a of the light transmissive window 121 and the front edge 122a of the upper surface 122 of the cover 120 in the travel direction of the vehicle. The round corner 123 is a portion of the cover 120 of the LiDAR apparatus 100 which is the most affected by the flow F of air which contacts the front surface 121a of the light transmissive window 121 and is then directed toward a bumper of the vehicle during traveling of the vehicle.

The heat transfer coefficient h is expressed according to the following equations (2) to (4).

$$h = Nu \times \lambda \div L \quad (2)$$

$$Nu = 0.037 \times Re^{4/5} \times P^{1/3} (Re > 3.2 \times 10^5) \quad (3)$$

$$Nu = 0.664 \times Re^{1/2} \times P^{\frac{1}{3}} (Re \leq 3.2 \times 10^5) \quad (4)$$

where λ is the thermal conductivity of air [W/m·K], Re is Reynolds number, and P is Prandtl number. The Prandtl number is the ratio of kinematic viscosity coefficient ν [m²/s] of air to thermal diffusivity coefficient α [m²/s] of air. The Reynolds number is given by the following equation (5).

$$Re = U \times L \div \nu \quad (5)$$

where U is the speed of vehicle [m/s].

Alternatively, if the controller 20 determines in step S16 that there is no snowfall around the vehicle, the routine proceeds to step S20 wherein the electrical power W that is a target power supply to the heater 20 is set to zero. In other words, when it is determined that there is no snow accumulation on the surface of the light transmissive window 121, and there is no snowfall around the vehicle, the controller 30 stops energizing the heater 20. Operations in steps S11 to S20 are tasks executed by the target amount-of-energization determiner 32.

In step S21, the controller 30 obtains the level of the battery voltage

In step S22, the controller 30 calculates the electrical power $W_0$ the battery 43 is capable of outputting as a function of the level of the battery voltage derived in step S21. The operations in steps S21 to S22 correspond to tasks of the permissible amount-of-energization calculator 33.

In step S23, the controller 30 determines the duty factor using the electrical power W, as derived in step S19 or S20, and the electrical power $W_0$, as calculated in step S22. Subsequently, the controller 30 terminates the determining operation in FIG. 4. The operation in step S23 corresponds to a task of the controlling value determiner 34.

The controller 30 executes a control operation, as apart from the determining operation in FIG. 4, to control energization of the heater 20 using the duty factor calculated in the determining operation in FIG. 4. The control operation corresponds to a task of the heater driver 35.

1-3 Beneficial Advantages

The above described first embodiment offers the following advantages.

1a) The controller 30 is configured to determine the snow accumulation condition of accumulation of snow on the surface of the light transmissive window 121 and the snowfall condition of a snowfall around the vehicle and control the energization of the heater 20 depending upon the snow accumulation condition and the snowfall condition. The controller 30 stops energizing the heater 20 for a period of time when it is determined that there is neither snow accumulation on the surface of the light transmissive window 121 nor snowfall around the vehicle. This prevents the heater 20 from being kept on in a condition where there is no need to activate the heater 20 in the absence of snowfall and snow accumulation, thereby eliminating the risk that drops of water adhered to the surface of the light transmissive window 121 may evaporate, so that they leave stains on the light transmissive window 121.

1b) The controller 30 determines, as the snow accumulation condition, the level of amount of the snow accumulation on the surface of the light transmissive window 121 and increases the amount of electricity supplied to the heater 20 with an increase in amount of snow accumulation on the surface of the light transmissive window 121. This achieves proper energization of the heater 20 depending upon the amount of snow accumulation on the surface of the light transmissive window 121.

1c) The controller 30 also determines, as the snowfall condition, the level of amount of snowfall around the vehicle and increases the amount of electricity supplied to the heater 20 with an increase in amount of snowfall around the vehicle. This achieves proper energization of the heater 20 depending upon the amount of snowfall around the vehicle.

1d) The controller 30 determines the snowfall condition using the result of detection made by the first detector 12a and the ambient temperature. The first detector 12a is realized by a typical detector usually installed in the LiDAR apparatus 100 to receive a wave reflected from a target object. The arrangements in this embodiment enable use of the first detector 12a to determine the snowfall condition, thereby eliminating the need for an additional special device to detect the snowfall condition and facilitating the detection of the snowfall condition.

1e) The detector 12 also includes the second detector 12b in addition to the first detector 12a. The second detector 12b works to detect a substance adhered to the surface of the light transmissive window 121. The controller 30 analyzes the result of detection achieved by the second detector 12b and the ambient temperature to determine the snow accumulation condition. Usually, a reflected wave arising from reflection of a transmit wave from a substance attached to the surface of the light transmissive window 121 is higher in light intensity than that resulting from reflection of a transmit wave from a target object to be measured in distance thereto because the time it takes for the transmit wave to travel, reflect from the substance attached to the light transmissive window 121, and then return to the transmitter 11 is usually shorter as compared with the target object. If, therefore, the wave reflected from the substance attached to the surface of the light transmissive window 121 is detected by the first detector 12a equipped with the amplifier circuit whose degree of amplification is selected only for the wave reflected from the target object, it will result in an undesirably increased signal intensity of the wave reflected from the substance, which may result in a failure in detecting the substance. Consequently, in this embodiment, the wave reflected from the substance attached to the surface of the light transmissive window 121 is detected using the second detector 12b which is designed not to amplify the intensity of received light or equipped with an amplifier, but the degree of amplification thereof is set to be low, thereby ensuring the stability and accuracy in determination of the snow accumulation condition. The transmitter 11 may be implemented by a typical device usually installed in the LiDAR apparatus 100 for use in measuring the distance to an object.

In the first embodiment, the operations in steps S13 and S14 correspond to tasks executed by a snow accumulation condition determiner. The operations in steps S16 and S17 correspond to tasks executed by a snow fall condition determiner. The operations in steps S15, and S18 to S23 correspond to tasks executed by a heater controller.

2 Second Embodiment 2-1 Differences from the First Embodiment

The second embodiment is basically identical in structure with the first embodiment. The differences from the first embodiment will mainly be described without referring to the common structural elements.

The controller 30 in the first embodiment is designed to control the energization of the heater 20 according to the mathematical function using parameters representing the ambient temperature and the vehicle speed. Specifically, in step S19 in FIG. 4, the controller 30 works to calculate the electrical power W to be supplied to the heater 20 according to the mathematical function using parameters representing the ambient temperature and the vehicle speed.

In the second embodiment, the controller 30 works to control the amount of electricity supplied to the heater 20 using tables representing predefined conditions to energize the heater 20 as a function of the ambient temperature and the vehicle speed. Specifically, the controller 30 calculates the electrical power W supplied to the heater 20 in step S19 in FIG. 4 by look-up using tables in which the electrical power W is predefined in relation to the ambient temperature and the vehicle speed. In the tables, the electrical power W is selected to increase with a decrease in ambient temperature or a rise in vehicle speed.

The tables include a total of six types of tables: three used in the event of snow accumulation and three used in the event of snowfall. The tables used in the event of snow accumulation are prepared for the levels of amount of snow accumulation on the surface of the light transmissive window 121, in other words, designed to store values increasing with an increase in amount of the snow accumulation on a table basis. Similarly, the tables used in the event of snow fall are prepared for the levels of amount of snowfall around the vehicle, in other words, designed to store values increasing with an increase in amount of the snowfall a table basis. The controller 30 selects a suitable one of the tables using the result of determination of the snow accumulation condition and the result of determination of the snowfall condition. Specifically, the controller 30 selects, in step S15 in FIG. 4, one of the tables used in the event of snow accumulation which corresponds to the level of amount of snow accumulation on the surface of the light transmissive window 121 determined in step S14 in FIG. 4. Alternatively, the controller 30 may select, in step S18, one of the tables used in the event of snowfall which corresponds to the level of amount of snowfall around the vehicle determined in step S17. Subsequently, the controller 30, in step S19, determines the electrical power W delivered to the heater 20 by look-up using the selected table. The values stored in the tables used in the event of snow accumulation are pre-set to increase the amount of electricity supplied to the heater 20 to be larger than that derived by the tables used in the event of snowfall.

2-2 Beneficial Advantages

The second embodiment is capable of controlling the energization of the heater 20 in a simpler way than in the first embodiment.

3 Other Embodiments

While the embodiments in this disclosure have been described, this disclosure is not limited to the above embodiments, but may be modified in various ways.

3a) In the above embodiments, the controller 30 expresses each of the amount of snow accumulation and the amount of snowfall in three levels: high, middle, and low, but it may be made in another way. For instance, each of the amount of the snow accumulation and the amount of snowfall may be expressed in two levels or four or more levels. Alternatively, the amount of the snow accumulation may be expressed in two levels, while the amount of snowfall may be expressed in three levels.

3b) In the above embodiments, the controller 30 is configured to determine whether snow is accumulated on the surface of the light transmissive window 121 and calculate the level of the amount of the snow accumulation when snow is determined to be accumulated on the light transmissive window 121. The controller 30 may, however, be designed not to determine the level of amount of the snow accumulation. Specifically, when determining that snow is accumulated on the light transmissive window 121, the controller 30 may set the target surface temperature $T_1$ for the heater 20 to the target surface temperature $T_a$ predetermined to be used in the event of snow accumulation.

3c) In the above embodiments, the controller 30 is configured to determine whether there is a snowfall around the vehicle and calculate the level of amount of the snowfall in the presence of snowfall around the vehicle. The controller 30 may, however, be designed not to determine the level of amount of snowfall. Specifically, when determining that there is a snowfall around the vehicle, the controller 30 may set the target surface temperature $T_1$ for the heater 20 to the target surface temperature $T_b$ predetermined to be used in the event of snowfall.

3d) In the above embodiments, the target surface temperature $T_a$ that is one of three temperatures $T_{a1}$, $T_{a2}$, and $T_{a3}$ used in the event of snow accumulation is selected to be higher than the target surface temperature $T_b$ that is one of three temperatures $T_{b1}$, $T_{b2}$, and $T_{b3}$ used in the event of snowfall, but however, they may be selected as another value. For instance, the target surface temperature $T_{b1}$ used in the event of snow accumulation may be set to be higher than the target surface temperature $T_{a3}$ used in the event of a snowfall.

3e) In the above embodiments, the measuring device 10 is equipped with the single transmitter 11. Each of the first detector 12a and the second detector 12b is designed to detect a reflected wave arising from reflection of a transmit wave, as emitted by the transmitter 11, from an object. The measuring device 10 may alternatively be equipped with a transmitter used only for the second detector 12b separately from the transmitter 11.

3f) In the above embodiments, the detector 12 is equipped with the first detector 12a and the second detector 12b, but however, may be designed not to have the second detector 12b. Specifically, the first detector 12a may be used to determine both the snow accumulation condition and the snowfall condition.

3g) In the above embodiments, the controller 30 analyzes the result of detection achieved by the detector 12 and the ambient temperature to determine the snow accumulation condition and the snowfall condition, but however, the snow accumulation condition and the snowfall condition may alternatively be determined in another way. For instance, the controller 30 may analyze weather information derived through a communications system to determine the snowfall condition. Specifically, the controller 30 may obtain information about the weather in a region including at least an area where the vehicle is now traveling using an external information and telecommunications system and determine the snowfall condition based on the amount of snowfall in that region derived by the weather information.

The controller 30 may also be designed to determine the snowfall condition using the ambient temperature and an operation of a wiper installed in the vehicle. Specifically, when the ambient temperature is less than or equal to the snowfall reference level, and the wiper is operating, the controller 30 may determine that there is a snowfall and also calculate the amount of snowfall as a function of the speed at which the wiper is moving and which is set in multiple levels, thereby determining the snowfall condition. The wiper may be implemented by a typical windshield wiper for a front window or windshield of the vehicle or a wiper designed to wipe the outer surface of the light transmissive window 121.

For instance, the controller 30 may also be designed to determine the snowfall condition using results of analysis of an image of surroundings of the vehicle which is captured by a camera installed in the vehicle. Specifically, an in-vehicle ECU may analyze data on images captured cyclically at a given interval by a camera to detect a snowfall and determine the status of the snowfall, such as the amount of snowfall around the vehicle. The controller 30 may determine the snowfall condition using results of the analysis achieved by the in-vehicle ECU.

3h) In the above embodiments, the heater 20 is equipped with the transmitter heater 21 and the detector heater 22. The transmitter heater 21 and the detector heater 22 each include the transparent conductive film Fi and the pair of electrodes LDi and LGi, but however, they may alternatively be designed to have another structure. For instance, the heater 20 may be made by a film heater which has a base film on which a meandering heater conductor is arranged.

3i) In the above embodiments, when determining that there is a snow accumulation or a snowfall, the controller 30 calculates the target electrical power W supplied to the heater 20 according to the mathematical function using parameters indicating the ambient temperature and the speed of the vehicle, but however, may be designed to calculate the target electrical power W according to a mathematical function using a parameter indicating the ambient temperature, not the speed of the vehicle when the speed of the vehicle is low. This is because when the vehicle is moving at low speed, the use of both the ambient temperature and the speed of the vehicle to calculate the target electrical power W may result in too low value of the target electrical power W, which leads to a failure in properly supplying electrical power to the heater 20. In order to alleviate such a problem, the controller 30 may be designed to calculate the target electrical power W according to the mathematical function using the parameter representing only the ambient temperature, thereby achieving proper control of energization of the heater 20 when the vehicle is traveling at low speed.

3j) In the above embodiments, the controller 30 works to control the energization of the heater 20 using the battery voltage in addition to the ambient temperature and the speed of the vehicle, but however, may alternatively be designed not to use the battery voltage to control the energization of the heater 20.

3k) In the above embodiments, the ranging apparatus is implemented by the LiDAR apparatus 100, but however, it may alternatively be made of a millimeter-wave radar or an ultrasonic sensor.

3l) In the above embodiments, the LiDAR apparatus 100 is mounted in a front portion of the vehicle, but however, may alternatively be arranged on the side or the rear of the vehicle.

3m) In the above embodiments, the light transmissive window 121 is a window through which a transmit wave and a return of the transmit wave will pass, but however, the light transmissive window 121 may be designed to permit at least one of the transmit wave and the return to pass. The light transmissive window 121 in the above embodiments is transparent to allow light (i.e., the transmit wave) to pass therethrough, but however, may alternatively be made of an opaque material as long as the light transmissive window 121 permits the transmit wave to pass therethrough. In other words, the material of the light transmissive window 121 may be selected depending upon the type of transmit wave.

3n) The functions to be executed by one of the structural units in the above embodiments may be shared with another of the structural units. Alternatively, the functions in some of the structural units may be made by one of the structural units. One or some of the structural units in each of the embodiments may be omitted. One of some of the structural units in each of the embodiments may be added to or exchanged with another embodiment.

3o) The LiDAR apparatus 100, the controller 30, the programs executed to realize a computer constituting the controller 30, the recording medium in which the programs are stored, or the method of controlling the energization of the heater 20 may be modified or realized in various ways in this disclosure.

What is claimed is:

1. A ranging apparatus which is mountable to a vehicle and configured to emit a transmit wave and detect a reflected wave resulting from reflection of the transmit wave from an object to determine a distance between the ranging apparatus and the object, comprising:
a transmitter which emits the transmit wave;
at least one detector which is configured to detect the reflected wave;
a light transmissive window through which at least one of the transmit wave and the reflected wave passes;
a heater which is configured to add heat to the light transmissive window;
a snow accumulation condition determiner which determines a snow accumulation condition indicating accumulation of snow on a surface of the light transmissive window;

a snowfall condition determiner which determines a snowfall condition indicating snowfall around the vehicle; and a heater controller which works to control energization of the heater depending upon the snow accumulation condition and the snowfall condition, wherein the heater controller stops energizing the heater for a period of time when it is determined that there is neither accumulation of snow on the surface of the light transmissive window nor snowfall around the vehicle, and wherein the snow accumulation condition determiner determines, as the snow accumulation condition, an amount of the snow accumulation on the surface of the light transmissive window, and the heater controller serves to control the energization of the heater by increasing an amount of electricity supplied to the heater with an increase in the amount of the snow accumulation on the surface of the light transmissive window.

2. The ranging apparatus as set forth in claim 1, wherein the detector includes a first detector and a second detector, the first detector being configured to detect a wave reflected from a target object to be measured in distance thereto, the second detector being configured to detect a wave reflected from a substance adhered to the surface of the light transmissive window, and the snow accumulation condition determiner determines the snow accumulation condition using a result of detection achieved by the second detector and an ambient temperature outside the ranging apparatus.

3. A ranging apparatus which is mountable to a vehicle and configured to emit a transmit wave and detect a reflected wave resulting from reflection of the transmit wave from an object to determine a distance between the ranging apparatus and the object, comprising:

a transmitter which emits the transmit wave;
at least one detector which is configured to detect the reflected wave;
a light transmissive window through which at least one of the transmit wave and the reflected wave passes;
a heater which is configured to add heat to the light transmissive window;
a snow accumulation condition determiner which determines a snow accumulation condition indicating accumulation of snow on a surface of the light transmissive window;
a snowfall condition determiner which determines a snowfall condition indicating snowfall around the vehicle; and
a heater controller which works to control energization of the heater depending upon the snow accumulation condition and the snowfall condition,
wherein the heater controller stops energizing the heater for a period of time when it is determined that there is neither accumulation of snow on the surface of the light transmissive window nor snowfall around the vehicle, and
wherein the snowfall condition determiner determines, as the snowfall condition, an amount of the snowfall around the vehicle, and the heater controller serves to control the energization of the heater by increasing an amount of electricity supplied to the heater with an increase in the amount of the snowfall around the vehicle.

4. The ranging apparatus as set forth in claim 3, wherein the detector includes a first detector and a second detector, the first detector being configured to detect a wave reflected from a target object to be measured in distance thereto, the second detector being configured to detect a wave reflected from a substance adhered to the surface of the light transmissive window, and the snow accumulation condition determiner determines the snow accumulation condition using a result of detection achieved by the second detector and an ambient temperature outside the ranging apparatus.

5. A ranging apparatus which is mountable to a vehicle and configured to emit a transmit wave and detect a reflected wave resulting from reflection of the transmit wave from an object to determine a distance between the ranging apparatus and the object, comprising:

a transmitter which emits the transmit wave;
at least one detector which is configured to detect the reflected wave;
a light transmissive window through which at least one of the transmit wave and the reflected wave passes;
a heater which is configured to add heat to the light transmissive window;
a snow accumulation condition determiner which determines a snow accumulation condition indicating accumulation of snow on a surface of the light transmissive window;
a snowfall condition determiner which determines a snowfall condition indicating snowfall around the vehicle; and
a heater controller which works to control energization of the heater depending upon the snow accumulation condition and the snowfall condition,
wherein the heater controller stops energizing the heater for a period of time when it is determined that there is neither accumulation of snow on the surface of the light transmissive window nor snowfall around the vehicle, and
wherein the snowfall condition determiner determines the snowfall condition using a result of detection achieved by the at least one detector and an ambient temperature outside the ranging apparatus.

6. The ranging apparatus as set forth in claim 5, wherein the detector includes a first detector and a second detector, the first detector being configured to detect a wave reflected from a target object to be measured in distance thereto, the second detector being configured to detect a wave reflected from a substance adhered to the surface of the light transmissive window, and the snow accumulation condition determiner determines the snow accumulation condition using a result of detection achieved by the second detector and an ambient temperature outside the ranging apparatus.

* * * * *